Patented July 25, 1950

2,516,599

UNITED STATES PATENT OFFICE 2,516,599

GENERATOR FED MOTOR CONTROL SYSTEM

Norman Harry Shaw and James Holmes Bennett, Stafford, England, assignors to The English Electric Company Limited, London, England, a British Company Application February 3, 1949, Serial No. 74,416
In Great Britain February 6, 1948

7 Claims. (Cl. 318—144)

1

Our invention relates to electric control systems and more particularly to control apparatus for controlling, that is, preventing current flow in a circuit until the voltage applied to the circuit is below a selected value.

In electric circuits conditions sometimes arise where it is desirable to prevent a current flowing in a given circuit until the voltage applied to the circuit exceeds a selected value. For example, it may sometimes be desirable to maintain the compounding effect of the field winding of a dynamo-electric machine of no effect as long as the load current does not exceed a selected value but to provide for the compounding effect to become effective as soon as the load current rises above the selected value. Where the dynamo-electric machine is a generator, the novel result may be obtained by connecting the compounding winding of the generator to the supply exciter which is, in turn, excited in accordance with the voltage across a shunt resistor or across a series winding in the armature circuit of the generator. The problem in this case is to prevent current flowing in the compounding winding of the generator until the exciter output voltage exceeds a predetermined value.

One broad object of our invention is the provision of causing the flow of an electric current in a circuit when the voltage applied to the circuit rises above a selected value.

Another broad object of our invention is the provision of a current flow in a circuit that remains constant at or near zero value as the voltage applied to the circuit rises from the zero value to some fixed greater value and which thereafter increases with a further increase of the voltage applied to the circuit.

A more specific object of our invention is the provision for compounding a dynamo-electric machine as a function of the load on the machine as the load increases from a selected value to a still higher value.

Figure 1:
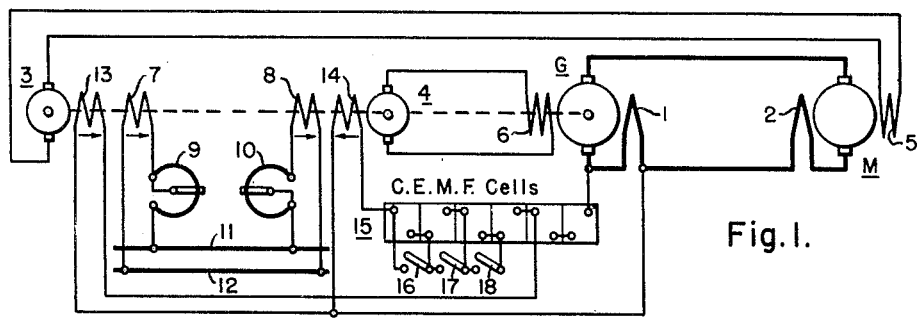
Figure 2:
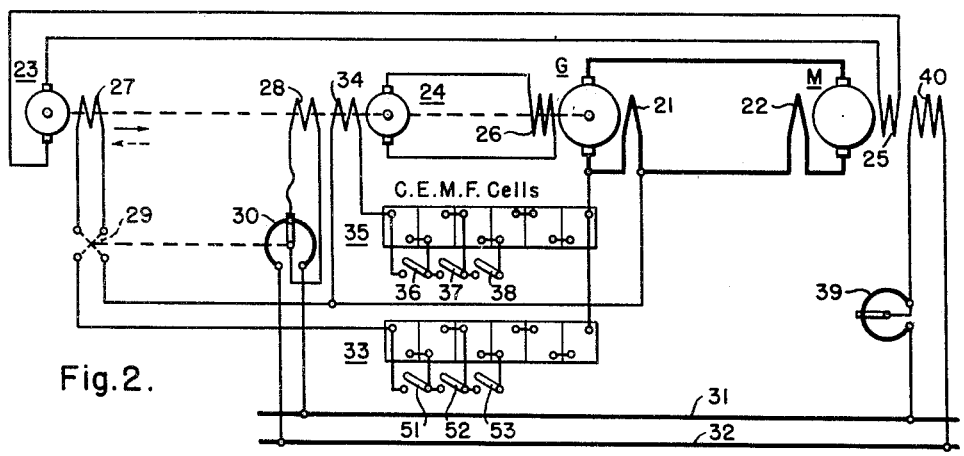
Figure 3:
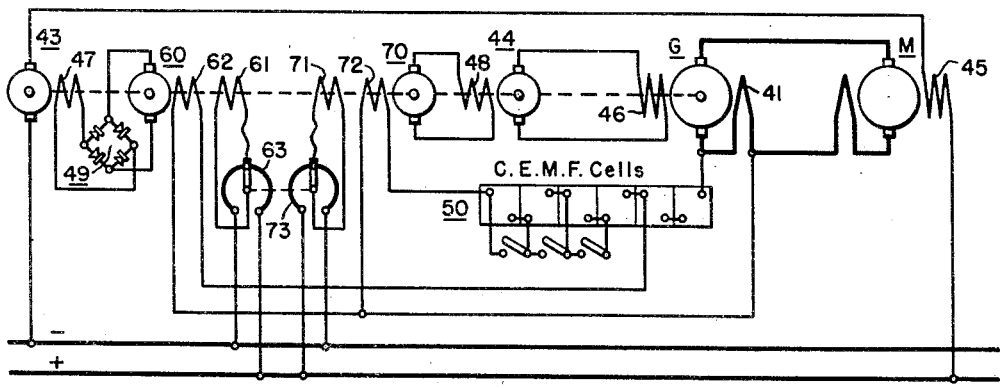

The objects recited are merely representative. Still other objects of our invention will become more apparent from a study of the following specification and the accompanying drawing, in which:

Figure 1 is a diagrammatic showing of a simple and preferred application of our invention to a motor-generator combination; and Figs. 2 and 3 are diagrammatic showings of modifications of our invention.

In Fig. 1, the motor M, driving a suitable load, not shown, is connected in a loop circuit with the main generator G. The loop circuit includes the series field windings 1 and 2 for the generator and motor respectively. The main generator G and the exciters 3 and 4 are driven from a suitable prime mover, not shown.

The motor M is provided with a separately excited field winding 5 connected directly to the exciter 3. The series field winding 2 is the compounding winding for the motor M. The generator G is similarly provided with a separately excited field winding 6 connected to the exciter 4. The series field winding 1 comprises a compensating winding for the generator G.

The exciters 3 and 4 have field windings 7 and 8, respectively, connected, through suitable rheostats 9 and 10, to the direct-current buses 11 and 12. The excitation values of the field windings 7 and 8 are adjusted to selected constant values and the sense of the excitation may be considered to be as indicated by the arrows adjacent the field windings 7 and 8.

The field winding 14 of the exciter 4 is connected across a selected number of sections of a counter-electromotive-force cell 15. The number of individual cells selected is determined by the nature of the control required of these cells. The cell 15 is connected so that the field winding 14, cell 15 and the series field winding 1 form a loop circuit. Since the series field winding 1 is also in the motor generator loop circuit, it is apparent that the field winding 14 and the cell 15 are subjected to the voltage drop across the terminals of the series field winding 1. Further, since the series field winding 1 carries the generator load current, it is apparent that the voltage drop across the field 14 and cell 15 is a measure of the generator load.

The cells, one form of which is known under the trade name "Nife Alkaline Counter E. M. F. Cells," produce an opposing voltage to the current regardless of whatever the direction of the current flow. Thus by including in the circuit a number of cells sufficient to produce an opposing voltage substantially equal to the voltage at which it is desired to initiate the current flow, only when the applied voltage exceeds this value will any current flow in the circuit. The opposing voltage produced by the cells varies only slightly with variations of the current flowing in the field winding 1 and the opposing voltage is substantially identical for current flowing in either direction.

The cells have almost infinitesimal capacity and may, therefore, be short circuited without fear of damage. This feature we utilize in our present invention to provide adjustment of the voltage at which the current flow in field 14 is to be initiated. Thus according to a further feature of the invention, adjustment of the voltage is obtained by short-circuiting, or by removing a short-circuit from one or more cells, as desired. No detailed description of the structure and nature of the electrolyte of the cell 15, well known in the art, need be here given since this invention does not relate to the cell 15 but to the control system in which the cell 15 is used as an element.

The number of individual cells of the cell 15 included in the loop circuit of field winding 14 is such as to prevent current flow in winding 14 until the voltage across the field winding 1, and thus the load of generator G, exceeds a selected value. This may, for example, be as much as two-and-one-half times the full load current of the main generator G. The sense of the excitation of the field winding 14 is in opposition to that of the field winding 8.

At load currents up to the mentioned two-and-one-half full load current, the excitation of the generator G will be determined solely by the voltage applied to the field winding 8 of the exciter 4 and the field winding 14 will be inoperative. If now, due to an increased load on the motor M, the load current exceeds the selected overload value, the voltage across the terminals of series field 1 will exceed the counter-electromotive force of the cell 15 and in consequence a current will flow through the field winding 14. This current will be in such a direction as to reduce the exciter voltage of the exciter 4, with the result that the output voltage of the main generator is decreased, since the field winding 6 is excited as a function of the voltage output of the exciter 4. The arrangement according to the invention thereby provides automatic protection against excess load currents in the generator, the control, however, remaining inoperative until the generator load current exceeds a predetermined value.

Similarly, excess values of regenerative currents, due to too rapid a reduction of the voltage of generator G, are automatically limited. Under such conditions, if the voltage of generator G is reduced, by means, say, of rheostat 10, a regenerative current will flow due to the electromotive force generated in the armature of motor M, which will be in an opposite direction to the load current, for the same voltage polarities across the armatures of G and M. If the value of this regenerative current is greater than the predetermined value for which the voltage across the compensating winding 1 is greater than the opposing voltage of the cell 15, a current will flow through winding 14, on exciter 4, in such a direction that the excitation of the latter and hence also of generator G will be increased. Thus the voltage of generator G will be increased and hence the regenerative current will be decreased. The arrangement, therefore, provides automatic protection against excess regenerative currents, as well as against excess load currents, the control, in either case, remaining inoperative until the generator armature current exceeds a predetermined value.

Contactors 16 to 18 across individual cells in the cell 15 provide a ready means for adjusting the total back voltage of the bank of cells and thus the predetermined current at which the excess current protection is initiated.

The exciter 3 is also provided with the field winding 13, but in the case of this exciter the two field windings 7 and 13 act in the same sense, under load conditions. The field winding 13 is connected in series with a selected number of sections of the cell 15.

This arrangement operates to introduce compounding of the motor M if the load current exceeds a value determined by the number of sections selected to be in circuit with field winding 13. Thus when the load current exceeds the selected value a current will flow in field winding 13 increasing the excitation of the exciter 3 and hence also the excitation of the motor M.

Similarly, under regenerative conditions, should the motor armature current exceed the predetermined value, a current will flow through winding 13 in such a direction as to cause a decrease in excitation of exciter 3 and thus also of the motor M.

If desired, the bank of counter-electromotive-force cells interconnected with the field windings of the two exciters may be entirely separate as shown in Fig. 2.

In Fig. 2 the motor M and generator G are connected in a loop circuit including the generator armature, the series field windings 21 and 22 of the generator and motor, respectively, and the motor armature.

The motor field 40 is separately excited from the constant potential buses 31 and 32 through the rheostat 39. The motor has a second field 25 excited from the exciter 23. The exciter 23 has a single field winding 27 connected, through a reversing switch 29, in a loop circuit including the series field winding 21, and the cells of the counter-electromotive-force cell 33.

In order that the control for the field winding 27 may be adjusted, suitable shunting circuits and switches 51, 52 and 53 are provided.

The exciter 24 is connected to excite the generator field 26. This exciter 24 is provided with a field winding 28 connected through a suitable reversing potentiometer 30, to the buses 31 and 32. The exciter 24 has a second field winding 34 connected in a loop circuit with the counter-electromotive-force cell 35 and the field winding 21. The contactors 36, 37 and 38 and the shunt circuits shown with these contactors provide independent adjustment of the control function for the field windings 34.

Since the motor M is provided with a separately excited field winding 40, the winding 25 is a compounding winding only. In this case, the exciter 23 need have but one field winding as 27 subject to the control of the device 33.

The voltage of the generator may, if desired, be made reversible and according to a further feature of the invention means are provided for maintaining the correct polarity of the exciter output voltage independent of the polarity of the generator output voltage. In one such arrangement, as shown in Fig. 2, the field winding 27 of the exciter 23 is supplied through a reversing contactor 29 so controlled that for one polarity of generator output voltage the excitation of field 27 is excited as shown by the full line arrow while for the opposite polarity of the generator G the field 27 is excited as shown by the broken arrow. The reversing switch 29 is mechanically coupled to the potentiometer 30 for the field winding 28 of exciter 24.

In the modification shown in Fig. 3, the reversing switch is replaced by the rectifiers 49. The showing in Fig. 3 is of particular utility with apparatus requiring rather large units for the generator G and the motor M. In such an application, the exciters 43 and 44 are machines of considerable size. The control is then effected through a pair of auxiliary exciters 60 and 70.

The exciter 60 has two field windings 61 and 62. The field winding 62 is connected to the constant potential buses 51 and 52 through the potentiometer 63.

The exciter 70 is also provided with two field windings 71 and 72. The field winding 71 is connected to the constant potential buses 51 and 52 through the potentiometer 73. The two potentiometers 63 and 73 are of the reversing type and are coupled mechanically so that their operation is ganged.

The field winding 62 of the exciter 60 is connected in a loop circuit including the series compensating field winding 41, a selected number of sections of the counter-electromotive-force cell 50, and the field 62. The excitation effect, after a selected voltage drop across field winding 41, is thus generally proportional to the generator load current.

The field winding 72 is connected in a loop circuit also including the series compensating winding 41 and the counter-electromotive-force cell 50. The excitation effect of field 72, after the generator is loaded to a selected value, is thus generally proportional to the generator load. The exciter 70 is connected to excite the field 48 of the exciter 44.

The exciter 60 supplies the field 47 of exciter 43 through the rectifier 49. The exciter 43 is coupled to excite the field winding 45 of the motor M. The rectifiers 49 provide for the same polarity of the exciter 43 regardless of the polarity of the main generator G. The correct direction of current flow in field winding 72 will of course be automatically maintained provided the reversal of the generator output voltage is effected by the potentiometer 73. Further, since the exciters 43 and 44 have but single field windings, a quick response, or amplifying characteristic, may be obtained.

Correct compounding under either normal loading of the generator or regenerative conditions for either polarity of generator armature voltage may be obtained by reversing the field excitation of field 61 whenever the armature voltage of generator G is reversed by operation of the potentiometer 73. Since the potentiometers 63 and 73 are mechanically connected, the correct operation is assured.

While we have shown and described but three modifications of our invention, our invention is not limited to the particular showings made, but includes such other embodiments and circuit arrangements that fall within the spirit of our invention.

We claim as our invention:

1. In a system of control, in combination, a generator having a compensating field winding, a load unit connected to the generator, a field winding for the generator, an exciter connected to excite the generator field winding, a counter-electromotive-force cell, two exciting windings for the exciter, one of said exciting windings being excited at a constant value and the other exciting winding being connected in a loop circuit including the generator compensating field winding, the counter-electromotive-force cell and the exciting winding of the exciter.

2. In an electric system of control, in combination, a generator, a load unit connected to the generator, an exciter for exciting the generator, said exciter having two field windings, one of said field windings being energized at a selected constant value, a counter-electromotive-force cell, means responsive to the load current of the generator, said second field winding being interconnected with the said means responsive to the generator load current and the counter-electromotive force cell, to produce an excitation effect in the said second field winding that is of substantially zero value for one range of generator loading and is generally proportional to the generator loading for all generator loads greater than said one range of generator loading.

3. In an electric system of control, in combination, a generator, a load unit connected to the generator, an exciter for exciting the generator, said exciter having two field windings, one of said field windings being energized at a selected constant value and in a given sense, a counter-electromotive-force cell, means responsive to the load current of the generator, said second field winding being interconnected with the said means responsive to the generator load current and the counter-electromotive force cell, to produce an excitation effect in the said second field winding opposite in sense to the excitation effect of the first winding that is of substantially zero value for one range of generator loading and is generally proportional to the generator loading for all generator loads greater than said one range of generator loading.

4. In an electric system of control, in combination, a direct-current generator having a series compensating field and a main exciting field, a motor connected to the generator, an exciter having its armature winding connected in a loop circuit with the main exciting field of the generator, and having a first field winding and a second field winding, a counter-electromotive-force cell, a loop circuit including said cell, the series field winding of the generator and the second field winding of the exciter, whereby the said second field winding produces an excitation effect of substantially no increase from a zero effect for load variations of the generator from zero to some selected substantial generator loading and produces an excitation effect that increases generally proportional to further increases of generator load above said selected substantial generator loading, said first exciter field winding being excited at a selected constant value in sense opposite to the excitation effects produced by the second exciter field winding.

5. In an electric system of control, in combination, a direct-current generator having a series compensating field and a main exciting field, a motor connected to the generator, an exciter having its armature winding connected in a loop circuit with the main exciting field of the generator, and having a first field winding and a second field winding, a counter-electromotive-force cell, a loop circuit including said cell, the series field winding of the generator and the second field winding of the exciter, whereby the said second field winding produces an excitation effect of substantially no increase from a zero effect for load variations of the generator from zero to some selected substantial generator loading and produces an excitation effect that increases generally proportional to further increases of generator load above said selected substantial generator loading, said first exciter field winding being excited at a selected constant value in sense opposite to the excitation effects produced by the second exciter field winding, a second exciter for exciting said motor, said second exciter also having a first field winding and a second field winding, said second field of the second exciter being also interconnected with the said cell and the series field to produce an excitation effect like the excitation effect produced by the second field of the first exciter, said first field of the second exciter being excited at a constant selected value in the same sense as the second field of the second exciter.

6. In an electric system of control, in combination, a direct-current generator having a series compensating field and a main exciting field, a motor connected to the generator, an exciter having its armature winding connected in a loop circuit with the main exciting field of the generator, and having a first field winding and a second field winding, a counter-electromotive-force cell, a loop circuit including said cell, the series field winding of the generator and the second field winding of the exciter, whereby the said second field winding produces an excitation effect of substantially no increase from a zero effect for load variations of the generator from zero to some selected substantial generator loading and produces an excitation effect that increases generally proportional to further increases of generator load above said selected substantial generator loading, said first exciter field winding being excited at a selected constant value in sense opposite to the excitation effects produced by the second exciter field winding, a reversing potentiometer for the said second field of the first exciter, a reversing switch for reversing the excitation of the second field of the second exciter, said reversing switch being mechanically coupled to the potentiometer to thus function in concert with reversing operations effected by said potentiometer.

7. In an electric system of control, in combination, a direct-current generator having a series compensating field and a main exciting field, a motor connected to the generator, an exciter having its armature winding connected in a loop circuit with the main exciting field of the generator, and having a first field winding and a second field winding, a counter-electromotive-force cell, a loop circuit including said cell, the series field winding of the generator and the second field winding of the exciter whereby the said second field winding produces an excitation effect of substantially no increase from a zero effect for load variations of the generator from zero to some selected substantial generator loading and produces an excitation effect that increases generally proportional to further increases of generator load above said selected substantial generator loading, said first exciter field winding being excited at a selected constant value in sense opposite to the excitation effects produced by the second exciter field winding, a reversing potentiometer for the second field of the first exciter, a rectifier for maintaining the same polarity on the terminals of the second exciter regardless of the directional excitation effected by the potentiometer.

NORMAN HARRY SHAW.
JAMES HOLMES BENNETT.

REFERENCES CITED

The following references are of record in the file of this patent:

UNITED STATES PATENTS

| Number | Name | Date |
|---|---|---|
| 518,360 | Waterhouse | Apr. 17, 1894 |
| 2,335,784 | Montgomery et al. | Nov. 30, 1943 |
| 2,469,899 | Sills | May 10, 1949 |